United States Patent [19]

Radel

[11] 4,157,769
[45] Jun. 12, 1979

[54] ON-SITE AGGREGATE MEASURE

[76] Inventor: Blaine F. Radel, P.O. Box 604, Hopkins, Minn. 55343

[21] Appl. No.: 906,327

[22] Filed: May 16, 1978

[51] Int. Cl.² ............................ G01F 19/00; B60P 1/56
[52] U.S. Cl. .................................... 222/43; 222/154;
222/608; 366/19; 414/287
[58] Field of Search ..................... 73/426, 427, 428;
366/16, 45, 46, 53, 19; 298/1 GD, 18; 222/41,
43, 282, 561, 166, 164, 154, 608; 214/18 PH, 17 C

[56] References Cited

U.S. PATENT DOCUMENTS

| 116,172 | 6/1871 | Ellithorpe | 366/53 |
| 1,242,032 | 10/1917 | Ott | 73/426 |
| 1,324,508 | 12/1919 | Leopold | 222/43 X |
| 1,829,182 | 10/1931 | Beaumont | 222/561 X |
| 1,834,670 | 12/1931 | Yett | 214/18 PH |
| 1,863,968 | 6/1932 | Dearing | 222/166 X |
| 1,987,289 | 1/1935 | Gardner et al. | 214/18 PH |
| 2,161,060 | 6/1939 | Kelsey | 73/427 X |
| 2,455,160 | 11/1948 | Burrow | 73/426 |
| 3,058,353 | 10/1962 | Irwin | 73/428 |
| 3,602,394 | 8/1971 | McCune | 222/43 |
| 3,730,396 | 5/1973 | Harper et al. | 222/166 |
| 3,905,519 | 9/1975 | Tertinek | 222/166 |
| 4,061,038 | 12/1977 | Clarke, Jr. | 73/427 |

Primary Examiner—Daniel M. Yasich
Attorney, Agent, or Firm—Keith B. Davis

[57] ABSTRACT

An on-site aggregate measure having a hopper with at least one fill level indicia representative of a predetermined measure of aggregate and including at least one opening for the introduction and emptying of aggregate together with means for emptying a fill of aggregate in fractional parts.

9 Claims, 8 Drawing Figures

ON-SITE AGGREGATE MEASURE

BACKGROUND AND FIELD OF THE INVENTION

The invention relates in general to aggregate measuring apparatus, in particular to such an apparatus which provides fractional part emptying of a measured fill of aggregate into a cement mixer and specifically to such an apparatus for measuring sand for small batches of cementitious like building material at a construction site.

Accurate mesurement and fractional part emptying of aggregate into an on-site cement mixer have long been known to be important to high quality masonry. Each batch of building material, be in concrete, mortar, plaster or other material consists of aggregate together with other consituents such as cement and water. The quality of the end product of such materials varies according among other things to the proportions of the various constituents, including the aggregate. Aggregate control is particularly difficult. Usually the aggregate is sand delivered to the site by the truck load and dumped into a pile. Frequently it is measured for a batch "by the shovel full". A worker counts the number of shovels of sand put into the mixer. The amount of sand per shovel full inevitably varies. The aggregate measure can be off by entire shovel fulls as a result of distractions or if the shovel count is otherwise lost. By contrast, control of the other constituents is usually highly accurate. They usually are added to the mixer as all of a pre-packaged accurately measured bag. The quality of a particular batch also is a function of the mixture homogeneity. It has also long been known that a more homogenous mixture is obtained if the various constituents are added in fractional parts, particularly the aggregate. It is common practice to add the aggregate of a mix in fractional parts. For example, a three cubic foot batch of mortar for standard cement block construction consisting of three cubic feet of mason's sand, one-half cubic foot of type S hydrated lime and one-half cubic foot of portland cement is commonly mixed as follows: in a standard cement mixer having a constantly rotating barrel, one-half of the sand is put into the mixer and enough water is added to form a slurry; after a short interval, all of the lime is added and water again added to maintain a slurry consistency; a short time later all of the cement and additional water is added to maintain a slurry consistency; finally, the remainder of the sand is added but this time only enough water is added to produce what is referred to as a "workable" mix. As a further illustration, it is well known that a standard mix of one part masonry cement and three parts masonry sand is properly mixed, using a standard mixer as described above, by: adding one-half of the sand plus enough water to form a slurry; after a short interval, adding all of the cement plus enough water to maintain the mix as a slurry; and, finally, after another short interval, adding the remainder of the sand, again with only enough water to produce a workable mix.

A general object of the invention is to provide an aggregate measuring apparatus.

An object of the invention is to provide a fractional part emptying aggregate measuring apparatus.

Another object of the invention is to provide an on-site aggregate measuring apparatus.

BRIEF DESCRIPTION OF INVENTION

Briefly, the on-site aggregate measure according to the present invention comprises a hopper having a fill level indicia representative of a hopper fill of a predetermined measure and including means for emptying a predetermined measure of aggregate in fractional parts. According to the preferred embodiment of the invention the aggregate measure includes a stand having a pair of rails for extending between a source of aggregate and the fill spout of a cement mixer and the hopper includes a carriage for traversal along the rails to permit filling of the hopper at the source of aggregate, moving of the hopper to and emptying the aggregate into a cement mixer fill spout, and returning of the hopper to the aggregate source for repeating of the operation.

DETAILED DESCRIPTION OF INVENTION

Figure 1:
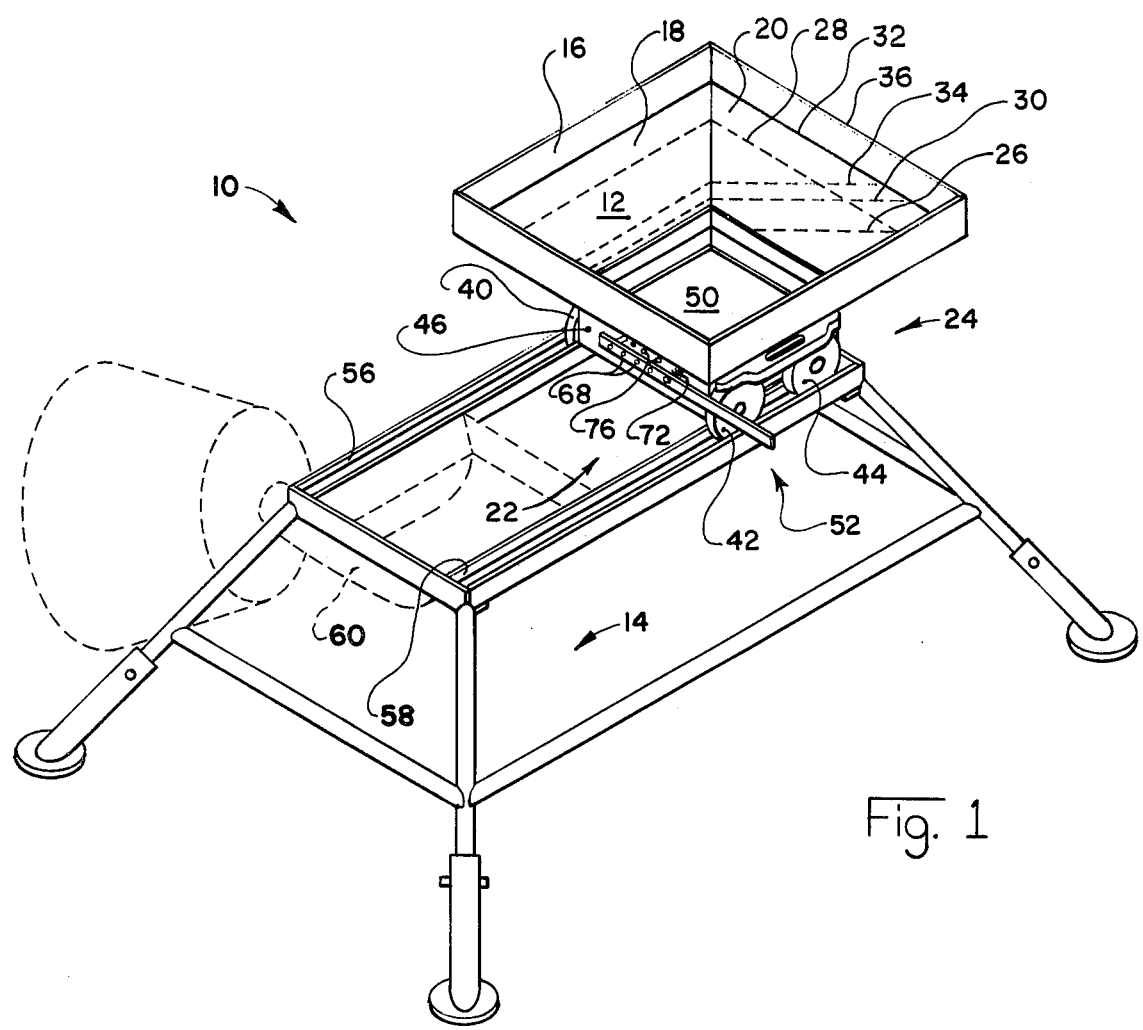
FIG. 1 is a perspective view of a preferred embodiment of an aggregate measure according to the present invention.

A perspective view of a theoretical preferred embodiment aggregate measure according to the present invention is shown generally as 10 in FIG. 1. Aggregate measure 10 includes a hopper 12 and a stand shown generally as 14. Hopper 12 has a rim 16, rear wall 18, two side walls only one of which is visible as 20, a front wall hidden from view in FIG. 1, means for emptying a fractional part of a predetermined measure of aggregate shown generally as 22, and a carriage shown generally as 24. Hopper 12 also includes three sets of fill indicia each of which includes a full and a half measure indicia for measures of three, six and nine cubic feet. Indicia 26 and 28 are the half and full measure indicia for a measure of three cubic feet and indicia set 30 and 32 and indicia set 34 and 36 are the corresponding indicia for six and nine cubic feet measures. The latter two full measure indicia, indicia 32 and 36, the six and nine cubic foot full measure indicia are the bottom and top of hopper 12 rim 16. Carriage 24 includes four wheels only three of which are visible and are designated 40, 42, and 44; the wheels are mounted by axles to carriage support 46. Fractional part emptying means 22 includes gate 50 which forms the bottom of hopper 12 and gate control means shown generally as 52. Stand 14 includes a rear rail 56 and forward rail 58. Rails 56 and 58 provide tracks for the carriage wheels. A cement mixer fill spout is shown in phantom in FIG. 1 as 60.

Figure 2:
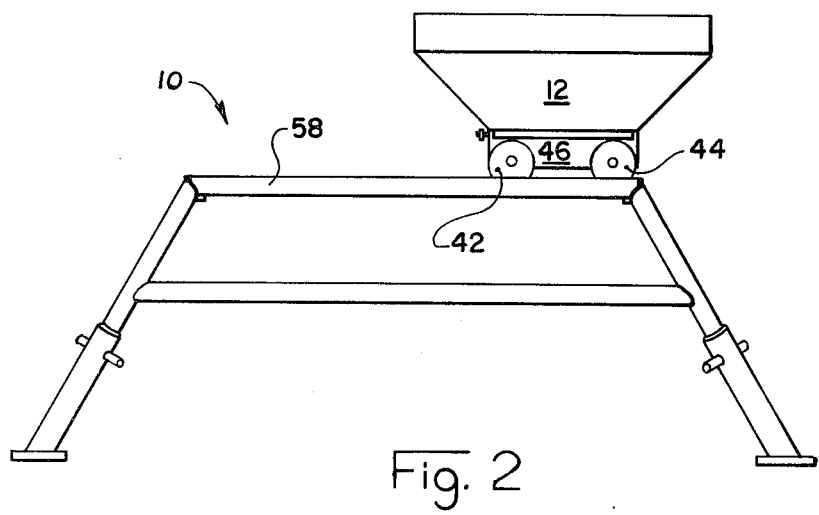
FIG. 2 is a front view of the aggregate measure of FIG. 1.
Figure 3:
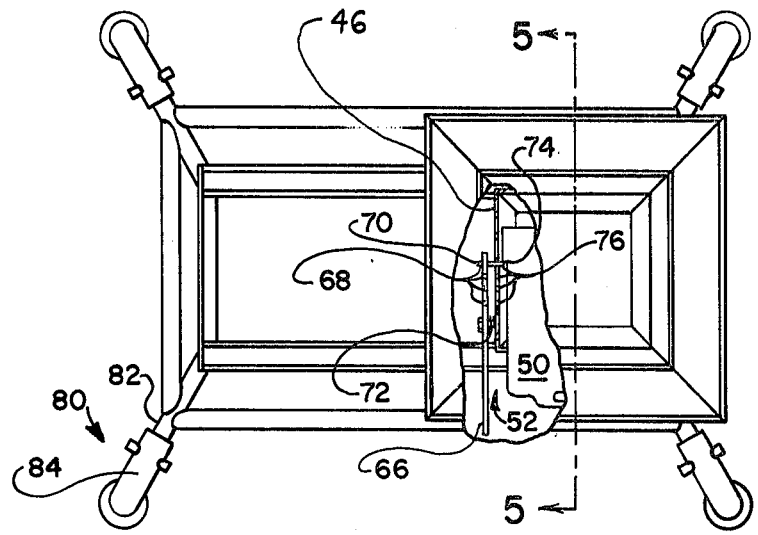
FIG. 3 is a top, partially cut away view of the aggregate measure of FIG. 1.
Figure 4:
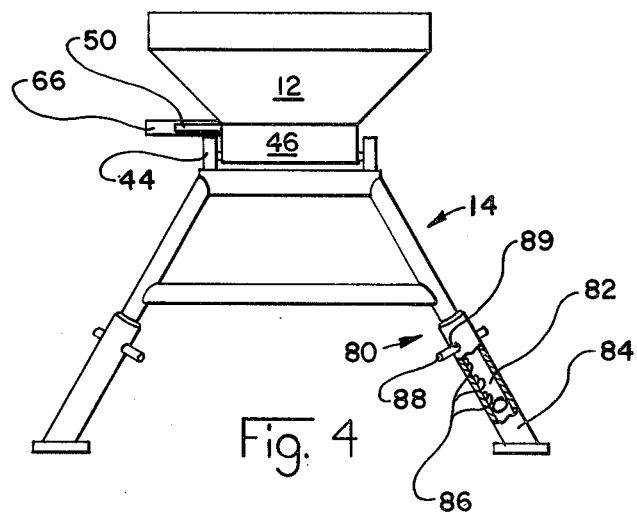
FIG. 4 is an end view of the aggregate measure of FIG. 1.

FIGS. 2, 3, and 4 are respectively front, top, and end views of the aggregate measure 10 of FIG. 1. Hopper 12 is partially cut away in FIG. 3 to illustrate the gate control means 52 and gate 50 cooperating structure.

Gate control means 52 includes a toggle handle 66 which has a plurality of apertures 68 and a toggle pin 70 mounted in one of the apertures 68. Toggle handle 66 is mounted against a spring 72 for pivotal movement in the horizontal plane. Gate 50 includes a stop 74 and hopper carriage support 46 includes a plurality of apertures 76 in registration with the apertures 68 of handle 66. Pin 70 is press fit into a selected aperture 68 but fits loosely in the corresponding aperture 76 to permit withdrawal of pin 70 from aperture 76 sufficient for stop 74 to clear pin 70 in response to pivoting of toggle handle 66. Stand 14 includes telescoping legs all of which are identical and one of which is shown generally as 80. Leg 80 includes an inner leg 82 and outer leg 84. In FIG. 4 leg 80 is partially cut away to show that inner leg 82 includes a plurality of apertures 86. Apertures 86 together with leg pin 88 and aperture 89 in outer leg 84 provide selection of the leg 80 length.

Figure 5:
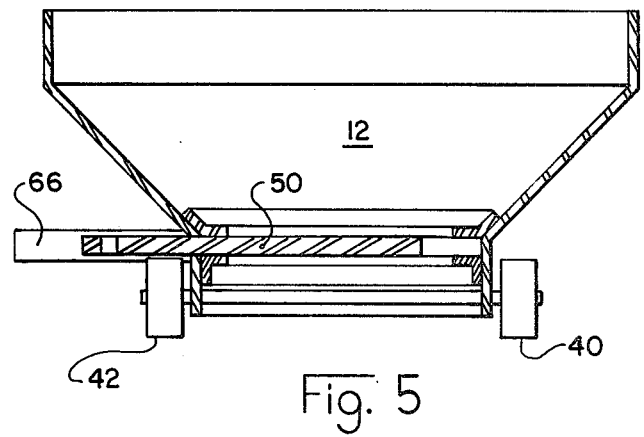
FIG. 5 is a sectional view of the hopper of the aggregate measure of FIG. 1 taken along line 5—5 of FIG. 3.

FIG. 5 is a sectional view through hopper 12 taken along line 5—5 of FIG. 3.

On-site use of an aggregate measure 10 shall be described with reference to an assumed batch size of three cubic feet. It shall be further assumed the aggregate is sand piled proximate the right end of stand 14. Preliminarily, pin 70 is positioned in an aperture 68 which positions gate 50 to gravity empty aggregate to half measure indicia 26 when stop 74 of gate 50 is contacting pin 70. This can be done by trail and error. (For larger batches pin 70 may be positioned in any aperture 68 because gate 50 can not be left open but must be closed when the aggregate has emptied to about the half measure indicia, measure 30 or 34 as the case may be.) With hopper 12 moved to the extreme right of stand 14 aggregate is put into hopper 12 approximately level with fill line 28. Hopper 12 is moved to the opposite end of stand 14 over fill spout 60. Gate 50 is withdrawn until stop 74 strikes the end of pin 70. A fractional part, about one-half, of the three cubic foot measure of aggregate gravity empties from hopper 12 into spout 60. Gate 50 is then closed and hopper 12 moved to the right far enough from spout 60 to allow adding of water and other constituents such as lime and cement. Finally, hopper 12 is again moved over spout 60, handle 66 pivoted to withdraw pin 70 from carriage support 46 aperture 76, and gate 50 fully withdrawn to empty the remainder of the sand. For larger batches, the procedure would be the same except as previously stated pre-positioning of pin 70 in a particular aperture 68 would not be necessary; the worker would monitor emptying of aggregate from hopper 12 and would close gate 50 when the top of the aggregate roughly coincided with the appropriate half measure indicia. It is to be understood that a full measure, and even a half measure, of sand weighs more than a worker can repetitively manually lift from a stockpile to a cement mixer spout. Stand 14 and carriage 24 provide ready movement of a full measure from a stockpile to a mixer spout and even easier movement of a half measure away from and back to the spout as above described.

Figure 6:
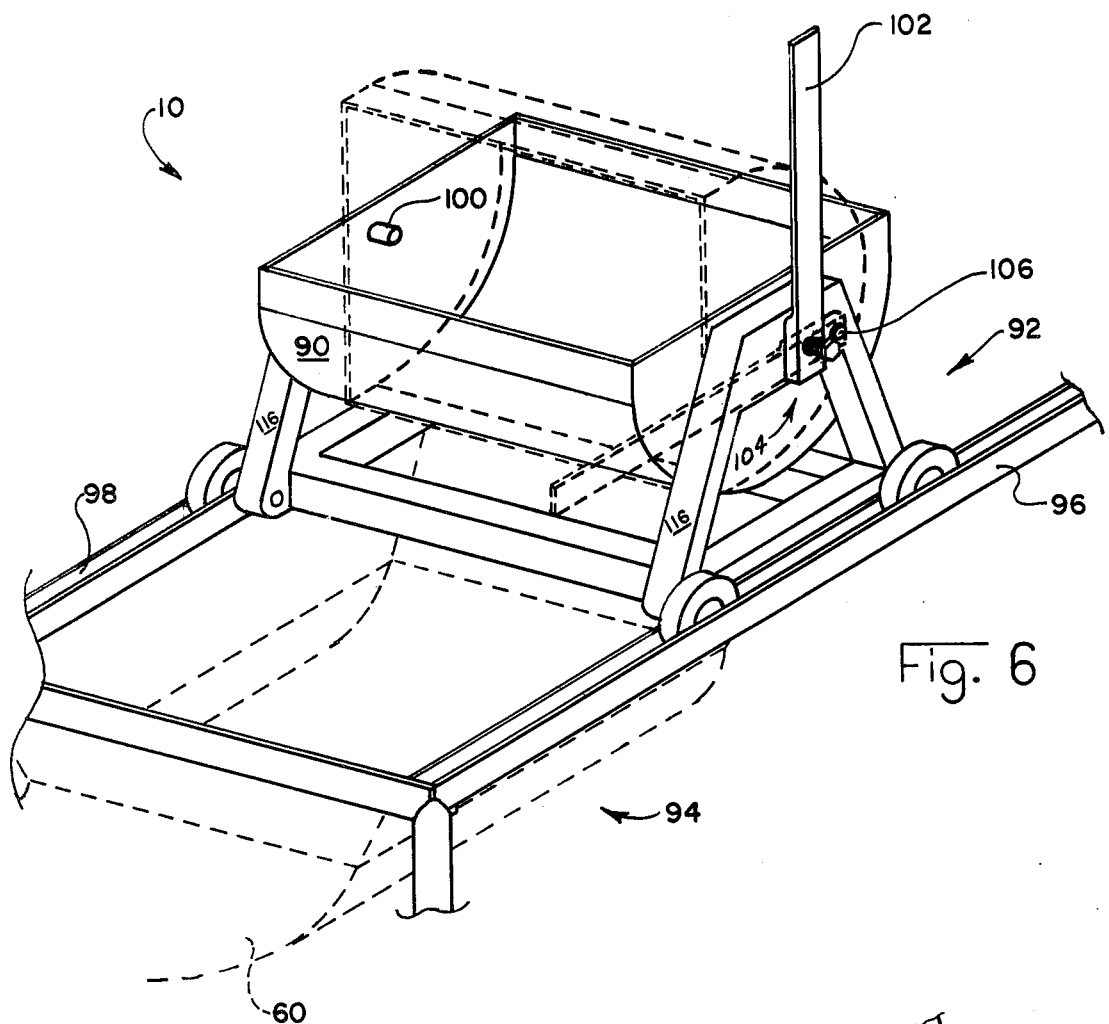
FIG. 6 is a perspective view of an alternative embodiment of an aggregate measure according to the present invention; and, FIGS. 7 and 8 are fragmentary views of the aggregate measure of FIG. 6 illustrating fractional part emptying means.
Figure 7:
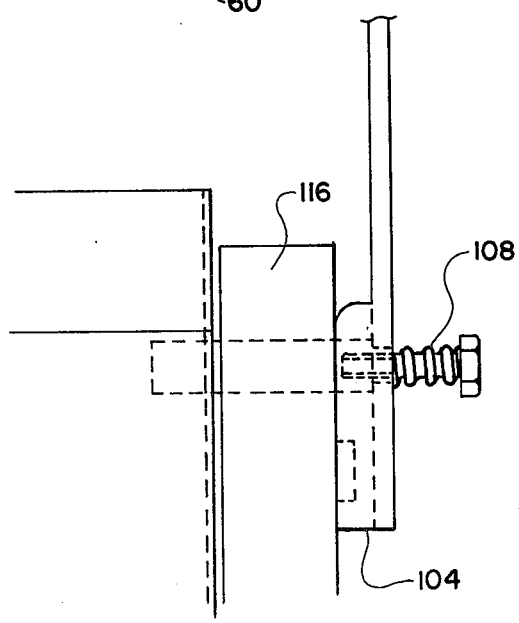
Figure 8:
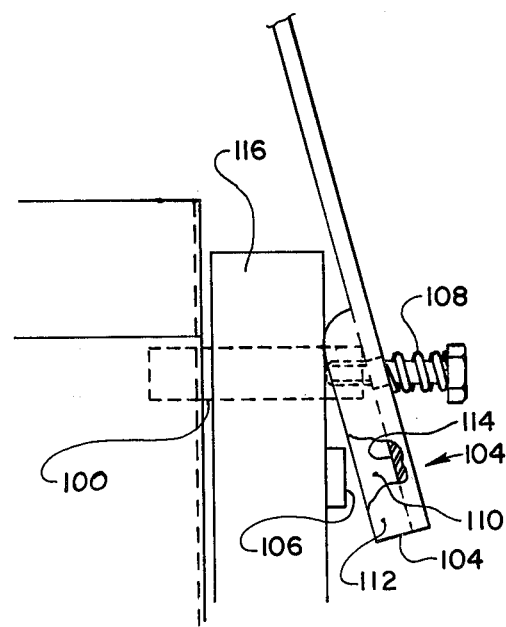

FIGS. 6, 7 and 8 are fragmentary views of a theoretical alternative embodiment of an aggregate measure according to the present invention. With reference to FIG. 6, measure 10 of the alternative embodiment includes a semi-circular hopper 90 having a carriage shown generally as 92, a stand shown generally as 94, and is illustrated with carriage 92 positioned for emptying of hopper 90 into a fill spout shown in phantom as 60. An emptying position of hopper 90 is also shown in phantom. Stand 94 includes a forward rail 96 and a rearward rail 98. Hopper 90 includes a pair of pivots 100 only one of which is visible in FIG. 6. Pivots 100 provide rotation of hopper 90 from a fill position, to emptying positions. For the particular illustrated embodiment, pivots 100 also serve as full measure indicia. Rotation of hopper 90 is by means of handle 102. Handle 102 includes a channel shown generally as 104 on its lower end for fitting over stop 106 to position hopper 90 in position for fractional emptying of a predetermined measure of fill. Handle 102 is normally biased in the position shown in FIG. 7 by a spring 108 but can be canted manually to a position as shown in FIG. 8 for positioning over and removal from stop 106 of channel 104 the latter of which is shown to be formed by side flanges 110 and 112 and bottom 114 of handle 102. It will be appreciated that a plurality of stops 106 could be provided at angularly spaced positions to provide for different emptying angles of hopper 90. The end of pivot 100 mates in channel 104 to provide turning of hopper 90. Each pivot 100 is rigidly secured to hopper 90 and properly journaled and provided with bearings in carriage upright 116.

The foregoing is given by way of illustration and not limitation and variations and modifications of the illustrative embodiments are within the scope of the invention. For example, again by way of illustration and not limitation, the present invention is deemed to encompass a stand having a lowered fill position and an elevated empty position with means for lifting the hopper from the fill to the empty position such as a garage door like spring mechanism.

What is claimed is:

1. An on-site aggregate measure comprising: in combination, a selectively moveable self-supported hopper guided on support means for moving the hopper between a position for receiving aggregate from an aggregate source and another position for gravity discharging the aggregate into a mixer spout by selectively moving at least a portion of said hopper and wherein said hopper includes at least one fill level indicia representative of a hopper fill of a predetermined measure, includes at least one opening for the introduction and emptying of aggregate, and includes fractional part emptying means for emptying a said predetermined measure of aggregate in fractional parts such as two parts each approximately equal to one-half of the predetermined measure.

2. An on-site aggregate measure according to claim 1 wherein said fractional part emptying means comprises a gate for selectively opening and closing a said aggregate emptying opening.

3. An on-site aggregate measure according to claim 2 wherein said gate comprises a slide in the bottom of said hopper moveable between an open and a closed position to empty aggregate from said hopper when said slide is in the open position, and which slide is adapted for closure with a load applied to permit closing of the gate after emptying only a fractional part of a measure.

4. An on-site aggregate measure according to claim 2 wherein said gate includes a series of graduated opening positions each of which corresponds to gravity discharge of a fractional part of a measure.

5. An on-site aggregate measure according to claim 1 wherein said means for emptying comprises pivot means for pivoting said hopper between aggregate retaining and aggregate emptying positions.

6. An on-site aggregate measure according to claim 5 wherein said hopper is open topped and said pivot means includes a first stop for limiting pivotal movement of said hopper at a position corresponding to discharge of a fractional part of a said measure and includes means for by-passing said stop.

7. An on-site aggregate measure according to claim 1 further comprising a stand for supporting said hopper.

8. An on-site aggregate measure according to claim 7 wherein said stand includes adjustable length legs.

9. An on-site aggregate measure according to claim 8 wherein said stand includes means for moving said hopper between fill and empty positions.

* * * * *